Jan. 16, 1962 A. M. OLSON 3,016,957
SOIL TILLING APPARATUS
Filed May 1, 1958 6 Sheets-Sheet 1
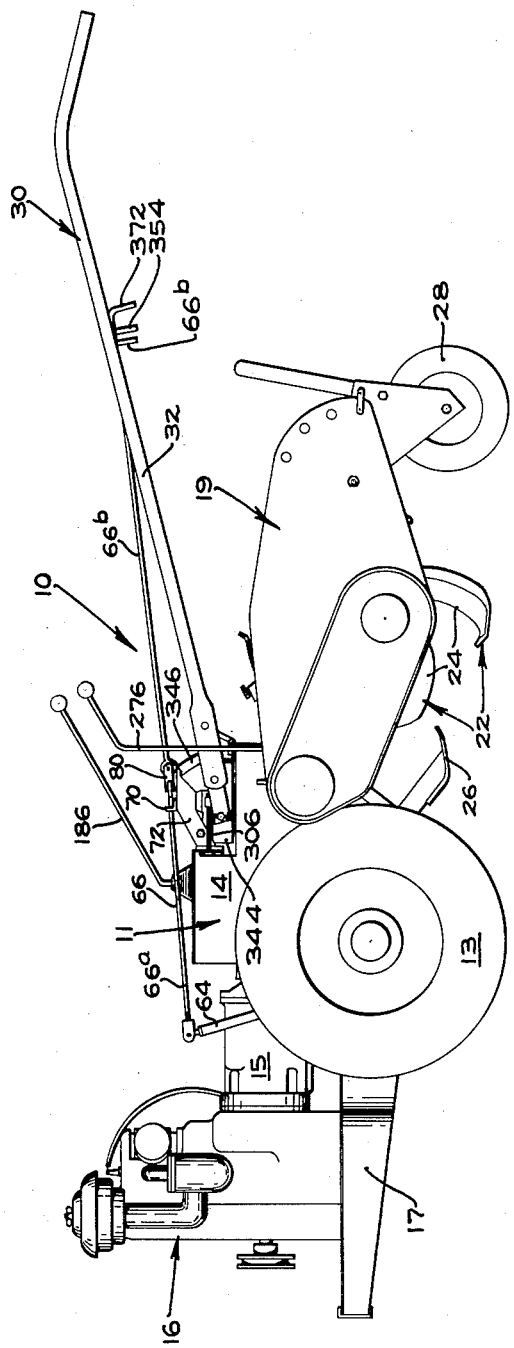
INVENTOR
ALBERT M. OLSON
BY Hans G. Hoffmeister
ATTORNEY

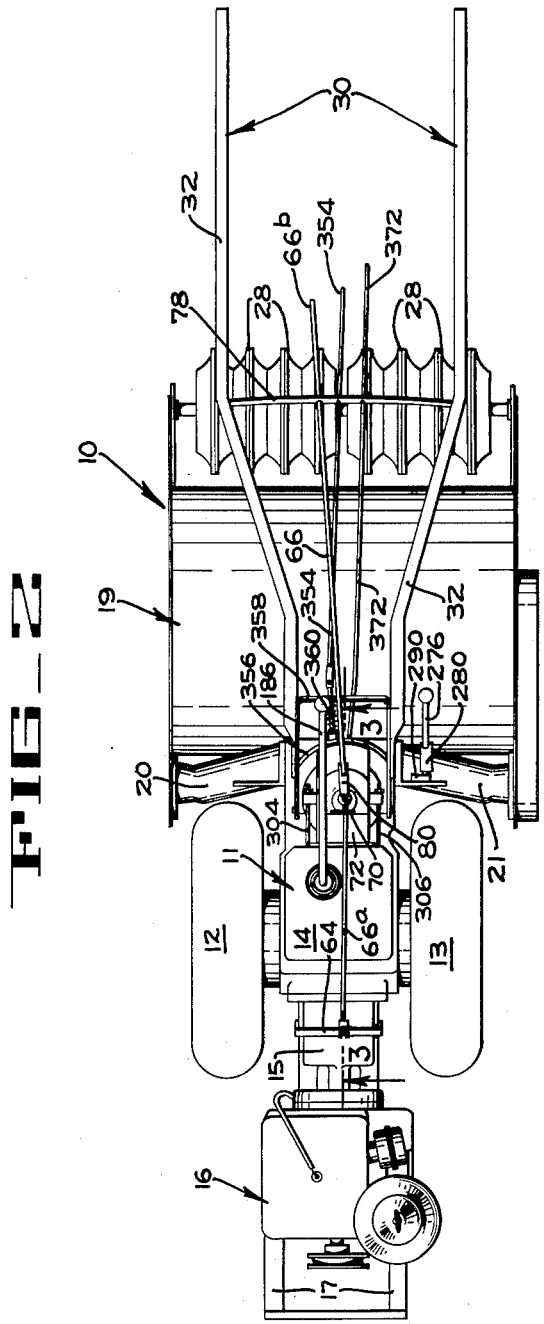

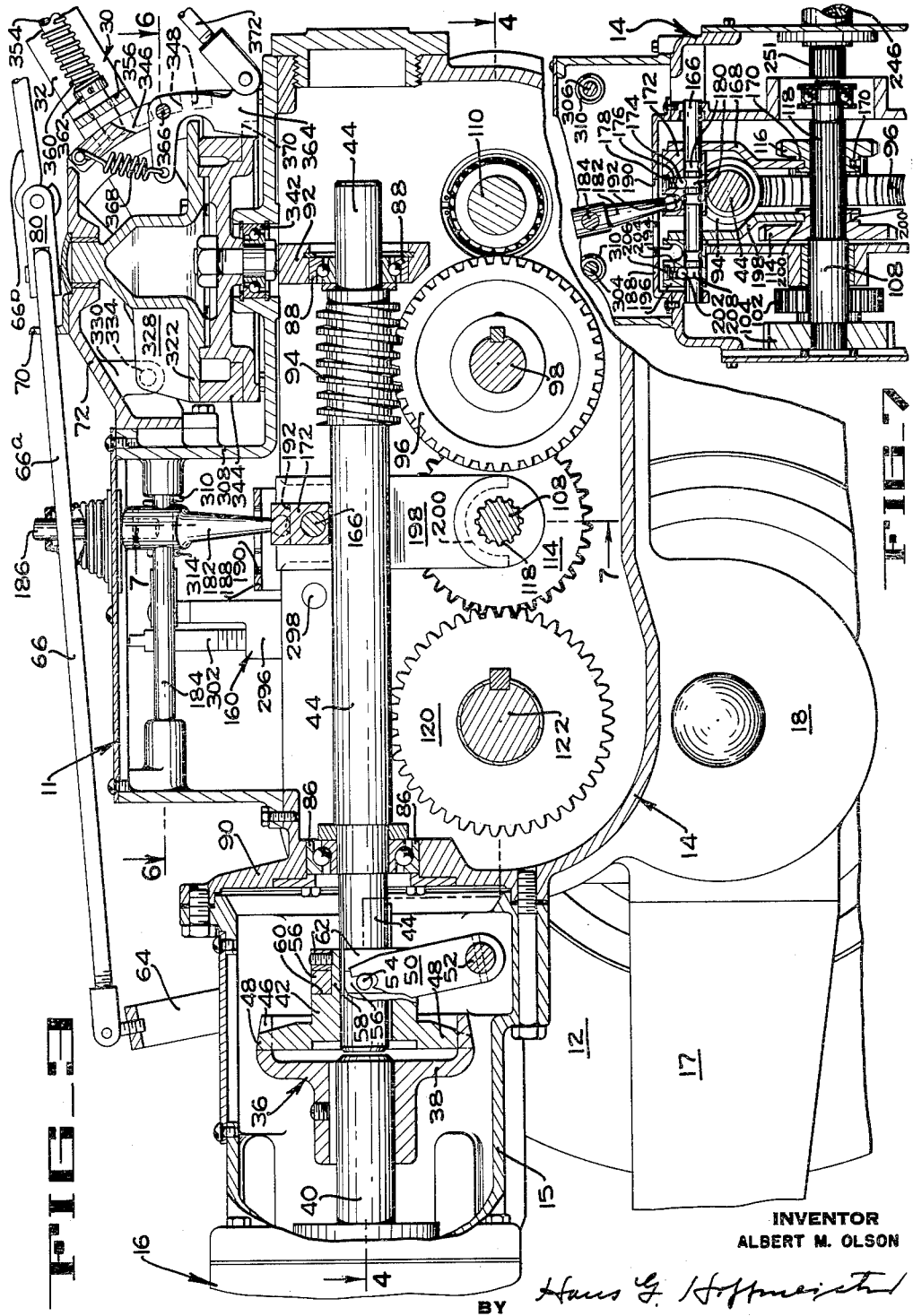

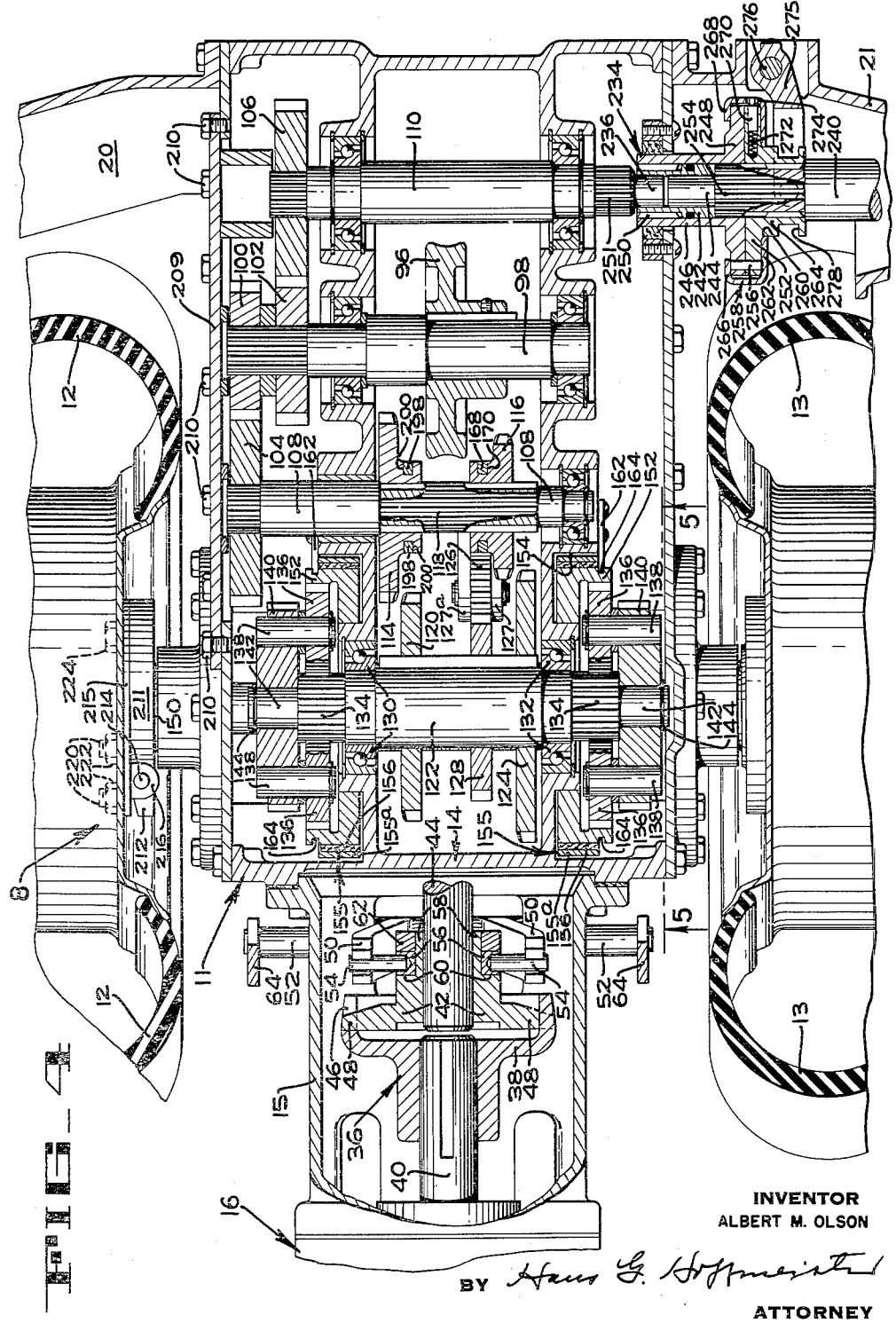

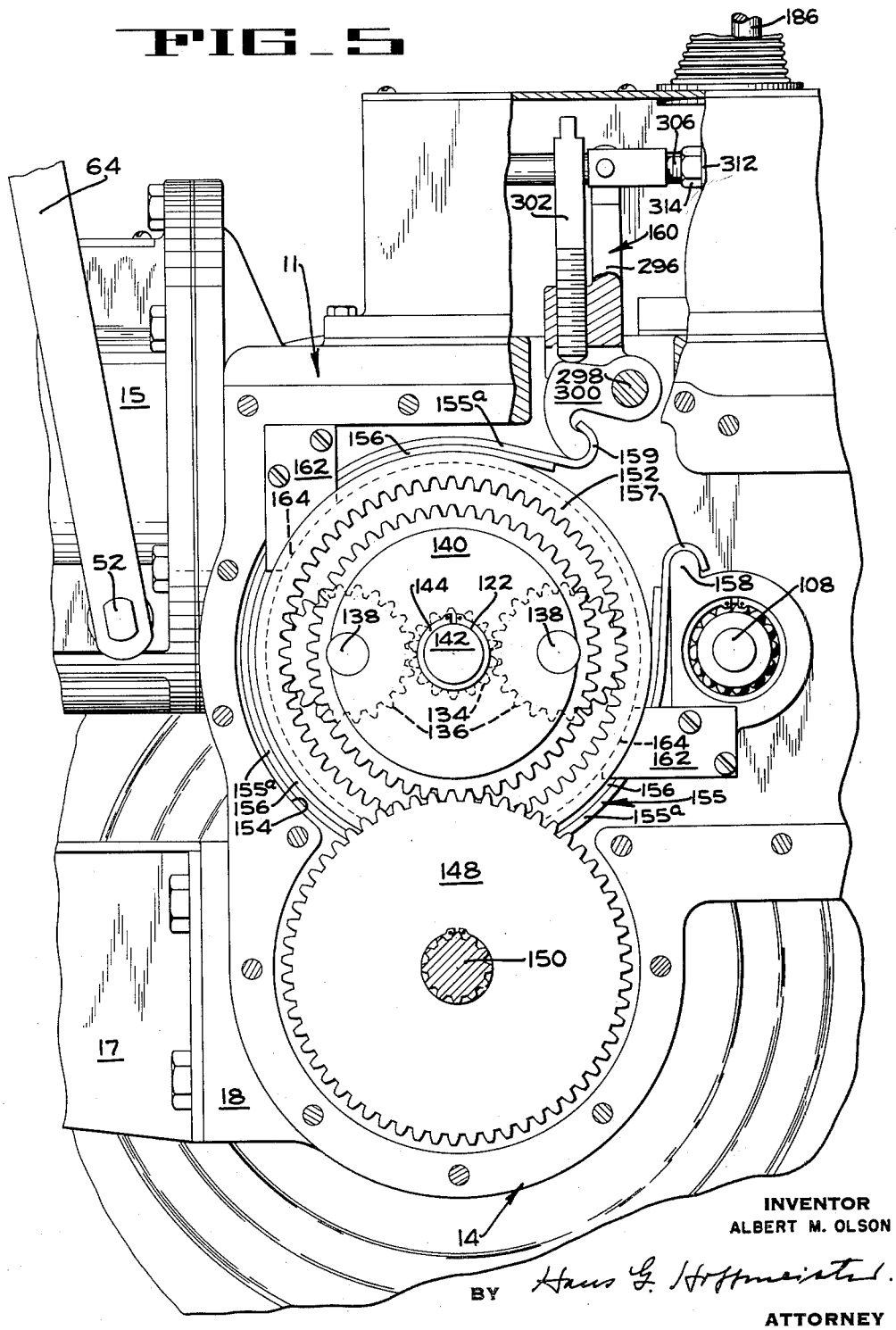

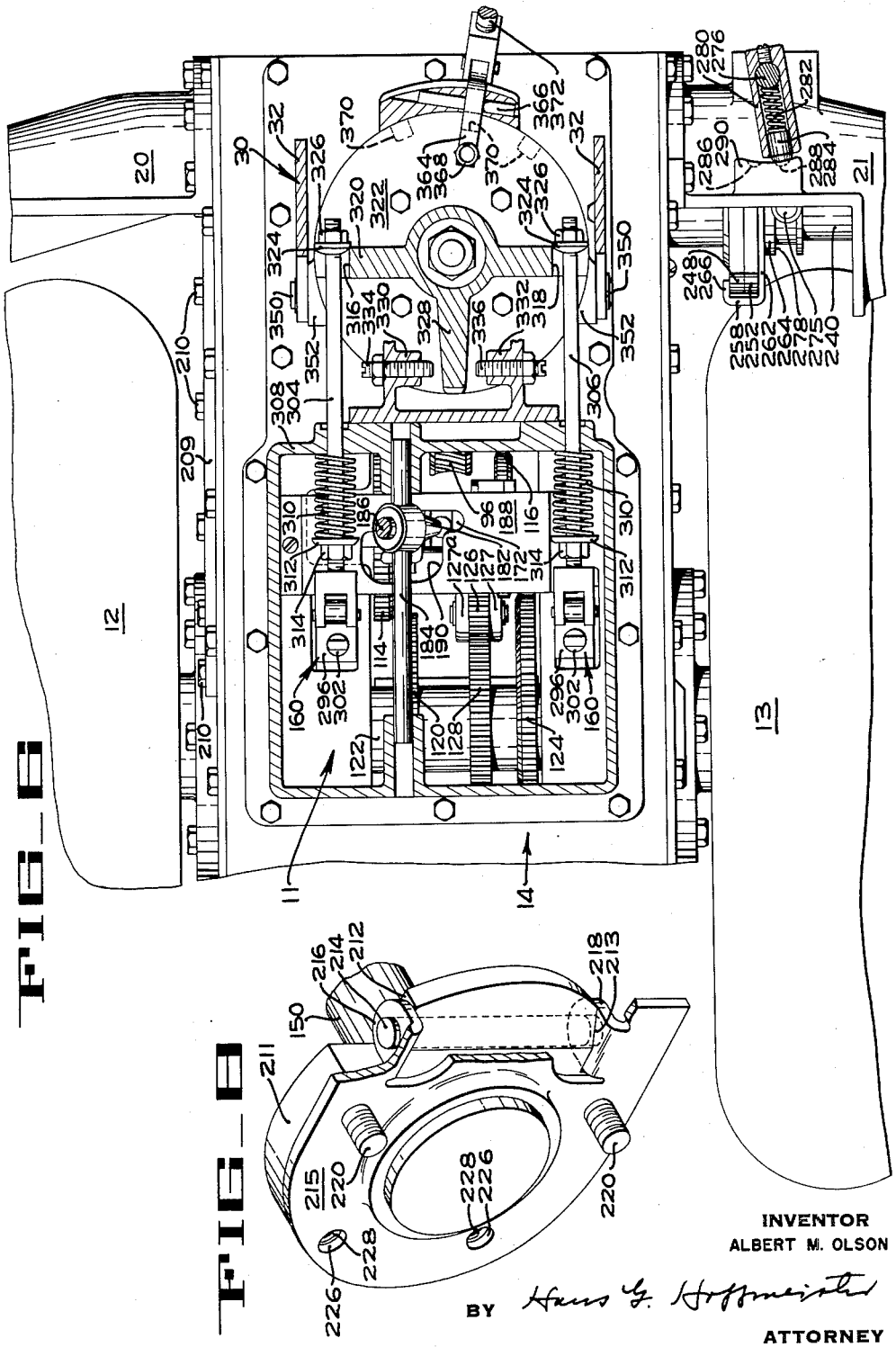

3,016,957
SOIL TILLING APPARATUS
Albert M. Olson, Sherman Oaks, Calif., assignor to FMC Corporation, a corporation of Delaware
Filed May 1, 1958, Ser. No. 732,262
3 Claims. (Cl. 172—42)

The present invention appertains to soil tilling apparatus of the type commonly referred to as garden tractors, and more particularly relates to power transmitting means for garden tractors or the like.

One object of the present invention is to provide improved power transmitting means for garden tractors or the like.

Another object is to provide improved steering means for garden tractors.

Another object is to provide power transmitting means for garden tractors which means includes improved apparatus for steering the tractor.

Another object is to provide improved power transmitting means for a garden tractor arranged to be selectively adjusted to provide a plurality of different speed combinations between the engine, the drive wheels, and the power driven tiller unit.

Another object is to provide means for more easily gaining access to certain internal drive parts of the transmission of the apparatus for selecting different gear ratios.

These and other objects and advantages of the present invention will become apparent from the following description and the drawings, in which:

FIG. 1 is a side elevation of the garden tractor of the present invention.

FIG. 2 is a plan of the garden tractor of FIG. 1.

FIG. 3 is an enlarged fragmentary vertical section taken along lines 3—3 of FIG. 2.

FIG. 4 is a fragmentary horizontal section taken along lines 4—4 of FIG. 3.

FIG. 5 is an enlarged fragmentary vertical section taken along lines 5—5 of FIG. 4.

FIG. 6 is a fragmentary horizontal section taken along lines 6—6 of FIG. 3.

FIG. 7 is a fragmentary vertical section taken along lines 7—7 of FIG. 3.

FIG. 8 is an enlarged perspective, with parts broken away, of a portion of the apparatus taken in the general direction of the arrow 8 in FIG. 4.

The garden tractor 10 (FIGS. 1 and 2) of the present invention is intended for heavy duty use and is especially adapted to operate efficiently in many different types of tillable soil. The tractor 10 is provided with a transmission 11 which offers the operator a selection of eight forward speeds and four rotor speeds thus enabling the operator to more effectively select a speed ratio which will result in the most efficient and desirable preparation of the particular soil being tilled.

It has been found that many garden tractors are difficult to operate around turns because of the effort needed to manually turn the machine and because of the increase in speed in the turn which is characteristic of many of these tractors due to the automotive type differential used. For this reason the tractor 10 is provided with certain drive parts which are arranged to aid in steering the tractor 10.

The tractor 10 (FIGS. 1 and 2) comprises the transmission 11 which is supported by two drive wheels 12 and 13. The housing 14 of the transmission 11 is bolted to a clutch housing 15 which is, in turn bolted to an engine 16. The engine 16 is rigidly secured to a frame 17 which is bolted to a wheel supporting portion 18 (FIG. 3) of the transmission housing 14. A rotary tiller housing 19 (FIG. 2) is bolted to mounting arms 20 and 21 which are secured to and project outwardly from opposite sides of the transmission housing 14. A tiller 22, which is rotatably mounted within the housing 19, may be driven by any well-known arrangement of drive parts and therefore these particular drive parts will not be described in detail. In order to set the maximum depth of cut of the tines 24 of the rotary tiller 22, either a vertically adjustable shoe 26, mounted forwardly of the tiller 22, or a vertically adjustable roller 28 may be used. The roller 28 is mounted rearwardly of the rotary tiller and is arranged to pack the soil after it has been tilled. A handle bar assembly 30 (FIGS. 1 and 2), including handle bars 32, is mounted for both vertical and horizontal adjustment on the upper rear portion of the transmission housing 14 and enables operators of different sizes to easily guide the tractor 10.

A clutch 36 (FIGS. 3 and 4) which operably connects the engine 16 to the transmission 11, comprises a spider jaw 38 keyed on an output shaft 40 of the engine 16, and a driven jaw 42 keyed on the transmission drive shaft 44 and axially slidable thereon. The spider jaw 38 has a plurality of slots 46 which are arranged to be locked in driving engagement with teeth 48 on the periphery of the driven jaw 42 when the driven jaw is moved to a clutch engaged position.

For moving the driven jaw 42 into and out of engagement with the spider jaw 38, a yoke 50 is locked on a transverse shaft 52 which is journaled for rotation in the lower portion of the clutch housing 15. The upper portion of each leg of the yoke 50 is slotted to receive pins 54 which are fixed in a slip ring 56 and project radially outwardly from each side of the ring. The slip ring 56 is received for rotation on a reduced diameter portion 58 of the driven jaw 42 and is held from axial movement on the jaw 42 between a shoulder 60, on the jaw 42, and a collar 62 locked on the reduced diameter portion 58. An inverted, upwardly extending U-shaped bracket 64 straddles the clutch housing 15 and has its lower ends rigidly secured on the shaft 52. A two piece clutch control rod 66 (FIGS. 1 and 3) is pivotally connected to the bracket 64 with the forward piece 66a guided for sliding motion by an angle member 70 mounted on a stationary bracket 72 secured to the transmission housing 14. The other piece 66b of the rod 66 is slidably mounted in a transverse member 78 of the handle bar assembly 30 and is connected to the forward piece 66a by a link 80 which permits both horizontal and vertical movement between the two pieces. Rearward movement of the clutch control rod 66 disengages the driven jaw 42 from the jaw 38 while forward movement of the rod 66 engages the two jaws.

The transmission drive shaft 44 (FIG. 3) is journaled for rotation in bearings 86 and 88 received in a forward end wall 90 and an intermediate wall 92, respectively, of the transmission housing 14. A worm 94 keyed on the transmission drive shaft 44 meshes with a worm gear 96 keyed on a transverse driven shaft 98 (FIGS. 3 and 4) journaled for rotation in the housing 14. One end of the driven shaft 98 is splined to receive two internally splined change gears 100 and 102 (FIG. 4). The gear 100 is of relatively small diameter and meshes with a change gear 104 of large diameter, while the gear 102 of intermediate diameter meshes with a change gear 106 of slightly larger diameter. The change gear 104 is mounted in driving engagement on the splined end of a sliding gear shaft 108 journaled in the transmission housing 14 and disposed parallel to the shaft 98; while the change gear 106 is mounted on the splined end of a power take-off shaft 110 which is journaled in the housing 14 and is parallel to the shafts 98 and 108.

The shafts 108 and 110 are spaced an equal distance from the shaft 98 and the splined ends of these three shafts are arranged to receive any of the change gears 100, 102, 104 and 106. It therefore becomes apparent that by mounting the change gears on different shafts, many different speed ratios between the shafts 98, 108 and 110 are made possible. The only limitation is that each set or drive train of change gears which are shown engaged in FIGURE 4 must be maintained as a set, i.e., the gear 100 must always mesh with the gear 104 and the gear 102 must always mesh with the gear 106.

Two sliding gears 114 and 116 are received on a splined portion 118 of the sliding gear shaft 108. The gear 114 is arranged to be slid axially on the shaft 108 into or out of mesh with a high speed gear 120 keyed on the sun gear shaft 122. The gear 116 is also axially slidable on the shaft 108 and is arranged to be moved into a position where it meshes with a low speed gear 124, or into a position where it meshes with an idler gear 126, or into an idle position where it does not engage either gear. The low speed gear 124 is keyed on the sun gear shaft 122 while the idler gear 126 is journaled in two ears 127 and 127a in the transmission housing 14 and meshes with a reverse gear 128 keyed on the shaft 122. The shaft 122 is journaled by means of bearings 130 and 132 in the transmission housing 14 and has a sun gear 134 fixed on the shaft 122 adjacent each end thereof.

Since the remaining portion of the power train to the right and left wheels 12 and 13, respectively, are identical, only the parts associated with the left wheel 13 as shown in FIGURES 4 and 5 will be described in detail. Like parts associated with the right wheel will be assigned identical numerals. The left sun gear 134 meshes with planet gears 136 (FIGS. 4 and 5) which are rotatable on pins 138 secured in a planet carrier gear 140, which carrier gear is rotatable on the end portion 142 of the sun gear shaft 122 and is held from axial movement by a snap ring 144.

The planet carrier gear 140 (FIG. 5) meshes with a wheel drive gear 148 which is rigidly secured to an axle 150 on which the left wheel 13 is mounted. The axle 150 is journaled in suitable bearings (not shown) in the left wheel supporting portion 18 of the transmission housing 14.

The planet gears 136 (FIGS. 4 and 5) mesh with the sun gear 134 previously mentioned, and also mesh with a ring gear 152 which is rotatable within an annular groove 154 formed in the transmission housing 14. A brake 155 having a brake band 155a with a brake lining 156 thereon is positioned around the smooth outer surface of the ring gear 152. A hooked end 157 (FIG. 5) of the brake band 155a is supported by a boss 158 integral with the transmission housing 14, while the other hooked end 159 of the brake band 155a is connected to a brake actuating lever 160. Both the brake band 155a and the ring gear 152 are held from axial movement by two plates 162 bolted to the transmission housing 14 and slidably received in an annular groove 164 (FIG. 4) in the outer surface of the ring gear 152.

It is apparent from the above that in order to drive the tractor 10 from the shaft 122 (FIG. 5) the ring gear 152 must be prevented from free rotation around the planet gears 136 by partially or completely stopping the same by means of the brake 155. For this reason each of the brake actuating levers 160 are arranged to normally hold the brake 155 in locked engagement around the ring gear 152 to prevent rotation of the same. The structure for accomplishing this will be described in detail presently.

The mechanism for selectively shifting the sliding gears 114 (FIG. 4) into engagement with the high speed gear 120, and for shifting the sliding gear 116 into engagement with the low speed gear 124 or with the reverse gear 128 through the idler gear 126, is best shown in FIGURES 3, 6 and 7. This mechanism includes a transverse shaft 166 (FIG. 3) which is secured to the transmission housing 14 and is positioned directly above the shaft 108 upon which the sliding gears 114 and 116 are mounted. A fork 168 (FIG. 7), which slidably engages the walls of an annular groove 170 in the gear 116, is secured to a block 172 slidable on the shaft 166. The block 172 is apertured to receive a ball 174, a spring 176 and a retaining plug 178 which compresses the spring 176 and forces the ball 174 selectively into one of three annular grooves 180 in the shaft 166. The ball 174 serves to hold the gear 116 selectively into each of its three positions, i.e., in the reverse, idle or low speed position.

To move the block 172, and hence the gear 116, into its different positions, a shifting finger 182 (FIG. 3) is slidably mounted on a longitudinally extending shaft 184 rigid in the transmission housing 14. A gear shift lever 186 is secured to the finger 182 and projects outwardly of the transmission housing 14 in position to be easily reached and manipulated by the operator. The movement of the finger 182 is guided by a plate 188 having a slot 190 (FIG. 6) of predetermined shape formed therein. The plate 188 is secured to the transmission housing 14 in position over the shaft 166. The slot 190 is so formed that the finger 182 is guided thereby into or out of a groove 192 (FIG. 7) in the block 172 only when the block is in its middle or neutral position. When engaged in the groove 192, the shape of the slot 190 will permit the finger to be moved to the right or left (FIG. 7) to thereby move the block 172 and gear 116 into any of its three positions of adjustment.

The slot 190 is also formed to guide the finger 182 into a slot 194 in a second block 196 slidable on the shaft 166 and to thereafter permit movement of the finger 182 and the engaged block 196 to the right in FIG. 7. A shifting fork 198 is secured to the block 196 and slidably engages the walls of an annular groove 200 in the sliding gear 114. A ball 202, spring 204 and spring retaining plug 206 are received in a hole in the block 196 in such a way as to force the ball 202 into either of two annular grooves 208 formed in the shaft 166. When the ball 202 is positioned in one of the grooves 208, the gear 114 is held in a neutral position and, when the ball 202 is in the other groove 208, the gear 114 is held in engagement with the high speed gear 120 (FIG. 4). Thus, by proper manipulations of the gear shift lever 186, the tractor 10 can be driven either in a reverse direction or in a forward direction through two different speed ranges.

As has already been pointed out, by proper manipulation of the sliding gears 114 and 116 (FIG. 4) and the change gears 100, 102, 104 and 106, the tractor 10 is given eight forward speed ranges and four rotor speed ranges. In order to gain access to the change gears to make necessary gear selections to obtain these speed ranges, a cover plate 209 (FIG. 4) may be removed from the transmission housing 14 by unscrewing bolts 210. The right wheel 12 is hinged to the right axle 150 (FIGS. 4 and 8). The axle 150 has a wheel hub 211 welded thereon which is relieved at 212 and 213 (FIG. 8) and drilled to receive a pivot pin 214 therein. A wheel mounting bracket 215 is provided with apertured, inturned ears 216 and 218 that are journaled on the pin 214 and are prevented from axial movement on the pin by shoulders formed by the relieved portion 212 and 213 of the hub 211. The right wheel 12 is rigidly connected to the bracket 215 by means of nuts 222 threaded on studs 220 welded to and projecting from the bracket 215 (FIG. 4). With the wheel 12 connected to the bracket 215 in this way, the rear portion of the wheel 12 can be easily pivoted away from the cover plate 209 while supporting its share of the weight of the tractor 10. Cap screws 224 are received in holes 226 (FIG. 8) in the bracket 215 and are screwed into tapped holes 228 in the wheel hub 211 to lock the wheel in driving position after the necessary changes have been made.

The previously mentioned power take-off shaft 110

(FIG. 4) is selectively connected in driving engagement to or disconnected from the rotary tiller 22 by a tiller clutch assembly 234. In its disengaged position, the clutch assembly 234 is mounted on the smooth end portion 236 of the power take-off shaft 110 and on a jack shaft 240 which is axially aligned with the shaft 110 and is suitably journaled in the tiller support arm 21. The jack shaft 240 is connected to the tiller 22 by any suitable drive (not shown), such as by a chain drive.

The clutch assembly 234 comprises a sleeve or bushing 242 mounted for rotation on the smooth end portion 236 of the shaft 110 and on a similar portion 244 of the jack shaft 240. A driving hub 246, having a flange 248 on one end and an internally splined portion 250 adjacent the other end, is rotatable and axially slidable on the bushing 242 and on a splined portion 254 of the jack shaft 240. The internally splined portion 250 is arranged to be selectively moved into or out of engagement with a splined portion 251 of the shaft 110. An internally splined portion of a driven flange 252 is engaged on the splined portion 254 of the jack shaft 240 and is axially slidable on the shaft 240. A shear pin 256 is received in mating holes in the flanges 248 and 252 to lock the same from rotation relative to each other. The flanges 248 and 252 are not circular but instead, have flat upper surfaces as indicated in FIGURE 6 and similar flat diametrically opposed surfaces (not shown). A clamping member 258, having an opening 260 in a supporting face 262 thereof, is loosely mounted around the hub 264 of the driven flange 252. Diametrically opposed, hooked end portions 266 and 268 of the clamping member 258 are arranged to hold the flanges 248 and 252 together and to prevent disengagement of the shear pin 256 from the flanges. The clamping member 258 is locked in the position shown in FIGURE 4 by a pin 270 which, with a spring 272, is received in a hole in the flange 252 and is resiliently urged outwardly by the spring 272 to engage a hole 274 in the hooked portion 268 of the member 258.

A yoke 275 is secured to an upstanding portion of a tiller shifting lever 276 which is mounted for pivotal movement in the arm 21. The forked end of the yoke 275 is slidably received in an annular groove 278 in the hub 264 of the driven flange. The shifting lever 276 can be actuated to shift the splined portion 250 into engagement with the splined portion 251 of the shaft 110 to thereby interconnect shafts 110 and 240 and drive the tiller 22, or, the shifting lever can be actuated to disengage the aforementioned splined portions as shown in FIGURE 4. For locking the clutch assembly 234 in each of the above mentioned adjusted positions, a tubular housing 280 (FIG. 6), having a spring 282 and a locking element 284 slidable therein, is fixed to the upstanding portion of the tiller shifting lever 276. The locking element 284 cooperates with two depressions 286 and 288 in a boss 290 to lock the clutch assembly 234 into the engaged and disengaged positions respectively.

The unique arrangement of parts for steering the tractor 10 is best shown in FIGURES 3, 5 and 6. As has been previously mentioned, power is transmitted to the tractor drive wheels 12 and 13 only when the brake 155 (FIG. 5) for each wheel is locked or partially locked against the associated ring gear 152 to prevent free rotation thereof. If the ring gears 152 are permitted to rotate freely, it is apparent that the planet carrier gears 140 will remain stationary and no power will be transmitted to the wheels. The tractor 10 of the present invention is steered by completely or partially releasing the brake 155 associated with one wheel 12 or 13 to interrupt the power transmitted to that particular wheel while full power is transmitted to the other wheel.

The apparatus for steering the tractor 10 includes the brakes 155 of each which is connected to one of the brake actuating levers 160. Since both brake actuating levers 160 are identical, the description of one will suffice for both. The actuating lever 160 comprises a yoke 296, shown partially cut away in FIGURE 5, rotatably mounted on a stub shaft 298 rigid with the transmission housing 14. A brake hook 300 is rotatable on the shaft 298 and is disposed between the legs of the yoke 296 and serves to support the end 159 of the brake band 155a. A brake adjusting bolt 302 is screwed through the body of the yoke 296 to engage the hook 300 for adjusting the same relative to the yoke 296.

Push rods 304 and 306 (FIG. 6) are pivotally connected to the right and left yokes 296, respectively, and project through an apertured transverse wall 308 of the transmission housing 14. A compression spring 310 is positioned around each of the rods 304 and 306 and between the wall 308 and a washer 312. The washer is backed by a nut 314 screwed on its associated rod 304 or 306. It can be seen that the springs 310 resiliently force the rods 304 and 306 to the left (FIG. 6). Thus, the springs 310 serve to urge both of the brake actuating levers 160 to pivot counter-clockwise (FIG. 5) and thereby lock the brakes on the ring gears 152 to prevent rotation thereof. It is apparent that the tension on the brakes 155 can be regulated by adjusting the nuts 314 and that additional tightening or loosening of each brake 155 independently of the other can be accomplished by using the adjusting bolts 302 (FIG. 6).

The rods 304 and 306 extend through slots 316 and 318, respectively, in a transverse member 320 of a turntable 322. A concave washer 324 is placed on each rod 304 and 306 and is held in position against the walls of its associated slot 316 or 318 by a nut 326. A tongue 328 on the turntable 322 projects between two stationary bosses 330 and 332 of the transmission housing 14 which has abutment bolts 334 and 336, respectively screwed therein. The bolts 334 and 336 cooperate with the tongue 328 to provide means whereby the tractor may be turned manually.

The turntable 322 (FIG. 3) is rotatably mounted on the transmission housing 14 by means of a bearing 342. A handle bar supporting ring 344 of the turntable 322 is rotatable relative to the major portion of the turntable 322. A vertical adjustment member 346, integral with the ring 344, is provided with a plurality of vertically spaced slots 348. The handle bars 32 (FIG. 6) are pivotally mounted for vertical movement on pins 350 secured in bosses 352 of the ring 344. A handle bar vertical adjustment rod 354 (FIG. 2) is slidable on the handle bar assembly 30 and is mounted on the transverse member 78 and other transverse members 356 and 358. A compression spring 360 is compressed between the member 358 and a collar 362 (FIG. 3) locked on the rod 354 to normally hold the forward end of the rod 354 into engagement with a selected one of the slots 348. Vertical adjustment of the handle bars 32 is made by pulling the rod 354 rearwardly out of engagement with the slots 348 thereby permitting the handle bars 32 to be pivotally adjusted vertically. The rod 354 is then released to engage the nearest slot 348 thereby locking the handle bars 32 in adjusted vertical position.

It is also desirable to adjust the handle bars horizontally. For accomplishing this, a latch 364 (FIGS. 3 and 6) is pivotally mounted on a pin 366 secured in the vertical adjustment member 346 of the ring 344. A spring 368 is secured between the latch 364 and the member 346 to normally urge the latch into engagement with one of three horizontally spaced notches 370 (FIG. 6) formed in the turntable 322. The notches 370 are so spaced as to either lock the handle bars 32 in alignment with the longitudinal axis of the tractor 10 or lock the handle bars approximately 30° to the right or left of the longitudinal axis. A horizontal adjustment control rod 372 (FIG. 2) is pivotally connected to the latch 364 for moving the same into or out of locking engagement with the notches 370. The control rod 372 extends rearwardly of the tractor 10 and is supported on the transverse member 78 (FIG. 2) in position easily reached by the operator.

Although the operation of the tractor 10 of the present invention is believed to be apparent from the above description, a brief summary of the operation will be given.

Power is transmitted from the engine 16 (FIG. 3) to the transmission drive shaft 44 by forward movement of the clutch control rod 66 which movement causes engagement of the engine clutch 36. This power is transmitted to the driven shaft 98 by the worm 94 and worm gear 96, and to the shafts 108 and 110 (FIG. 4) by the change gears 100, 102, 104 and 106. The change gears can be positioned in different arrangements on the shafts 98, 108 and 110 to make possible many different speed ratios between the three shafts. The sliding gear 114 can be engaged with the gear 120 to drive the tractor at a high forward speed, or, the sliding gear 116 can be engaged with the gear 124 to drive the tractor 10 forward at a slower speed. If the sliding gear 116 is engaged with the idler gear 126 the tractor is driven in reverse. The sliding gears 114 and 116 are slidably moved into or out of engagement with the above mentioned gears by proper manipulation of the gear shift lever 186 (FIGS. 3 and 7).

Power is transmitted independently from the shaft 122 to each drive wheel 12 and 13 by stopping, or partially stopping the motion of the ring gear 152 within which the planet gears 136, carried by the planet carrier gear 140, are rotated by engagement with the sun gear 134. Each planet carrier gear 140 (FIG. 5) is rotated when its associated ring gear 152 is stationary, thereby transmitting power to its drive wheel 12 or 13 through the gear 148.

The ring gear 152 corresponding with each wheel 12 or 13 is selectively prevented from rotation or allowed to rotate by tightening or loosening, respectively, its corresponding brake 155. Both brakes 155 are locked when the tractor 10 is driven in a straight line and one of the brakes 155 is loosened when it is desired to turn the tractor.

To turn the tractor 10 to the left, the left brake 155 is loosened by moving the handle bars 32 to the right, or counterclockwise as viewed in FIG. 6. This action pulls rearwardly on the rod 306 thereby pivoting the brake actuating lever 160 associated with the left wheel 13 clockwise (FIG. 5) thus loosening the left brake 155. In this way the left wheel 13 is not driven, or is only partially driven, depending upon the desired radius of turn, while the right wheel 12 is driven under full power. Hence, the tractor 10 is turned to the left. It is to be noted that the operator can help in making a very sharp left turn by exerting force on the handle bars 32 which force is transmitted by means of the tongue 328 to the bolt 336. It is also to be noted that the speed of rotation of the right wheel is not increased during a left turn, as is the case when automotive type differentials are used, thereby making it easier for the operator to control the tractor 10 in turns. Obviously, the above procedure is reversed when making a turn to the right.

It is apparent from the foregoing description that the garden tractor of the present invention discloses a unique arrangement of parts for steering the tractor. The tractor includes a transmission which can be selectively arranged to drive the tractor through eight different forward speed ranges and selectively arranged to drive the rotary tiller through four different speed ranges. In this way the tractor is ideally suited for heavy duty operation in all types of tillable soil. Also included in the tractor is a unique device for hingedly mounting one wheel on its axle so that the wheel can be pivoted away from the side of the transmission housing for ease in gaining access to certain transmission parts.

While one embodiment of the present invention has been shown and described, it will be understood that various changes and modifications may be made without departing from the spirit of the invention or the scope of the appended claims.

Having thus described the present invention and the manner in which the same is to be used, what is claimed as new and desired to be protected by Letters Patent is:

1. In a transmission for an apparatus for tilling soil, a power steering mechanism comprising a housing, a power driven shaft mounted for rotation transversely of said housing, a sun gear secured to said shaft adjacent each end thereof, a planet carrier gear for each sun gear journaled for rotation on the end of said shaft adjacent its respective sun gear, two planet gears rotatably mounted on each of said carrier gears and meshed with the associated sun gear, a ring gear for each two associated planet gears and rotatable about and meshed with said associated planet gears when said related carrier gear is stationary, independently operable brake means around each ring gear and normally arranged to be clamped on said ring gears to stop the same from rotation whereby to cause said carrier gears to rotate, an axle radially spaced from and disposed parallel to said shaft and rotatably mounted in said housing, a ground engaging drive wheel secured to each of said axles, a drive gear secured to each axle and disposed in meshing engagement with said associated carrier gear, and means connected to each of said brake means and arranged to be actuated to selectively release only one brake means at a time thereby causing said soil tilling apparatus to be turned by power transmitted to one wheel only.

2. In a transmission for an apparatus for tilling soil a power steering mechanism comprising a housing, a power driven shaft mounted for rotation transversely of said housing, a sun gear secured to said shaft adjacent each end thereof, a planet carrier gear for each sun gear journaled for rotation on the end of said shaft adjacent its respective sun gear, two planet gears rotatably mounted on each of said carrier gears and meshed with the associated sun gear, a ring gear for each two associated planet gears and rotatable about and meshed with said associated planet gears when said related carrier gear is stationary, independently operable brake means around each ring gear and normally arranged to be clamped on said ring gears to stop the same from rotation whereby to cause said carrier gears to rotate, an axle associated with each carrier gear and rotatably mounted in said housing, a ground engaging drive wheel secured to each of said axles, a drive gear secured to each axle and disposed in meshing engagement with said associated carrier gear, a turntable mounted for horizontal pivotal movement on said housing and having a transverse member integral therewith, brake actuating means on opposite sides of the pivotal axis of said turntable, each brake actuating means being connected between said transverse member and one of said brake means, and handle bars connected to said turntable to pivot the same whereby the braking pressure of said brake means are independently controlled to determine the direction of travel of the apparatus.

3. In an apparatus for tilling soil having power transmitting means and being supported on two drive wheels, the combination of a turntable, a pair of radially directed apertured members on said turntable, a pair of rods, one of said rods being loosely received in the aperture in one of said members, and the other of said rods being loosely received in the aperture of the other member, a nut on each rod disposed on one side of said associated member and arranged to cause one of said rods to move axially upon pivotal movement of said turntable in one direction and the other of said rods to move axially upon pivotal movement of said turntable in the opposite direction, a pair of brake actuating levers, one lever being connected to and operable by one rod and the other lever being connected to and operable by the other rod, a brake connected to one of said levers and movable by said one lever between a locked position wherein one of the drive wheels is locked in driving engagement with the power transmitting means and an unlocked position wherein said one wheel is disengaged from the power transmitting means, a second brake connected to the other of said levers and movable by said other lever between a locked position wherein the other drive wheel is locked in driving engagement with the power transmitting means and an unlocked position wherein said other wheel is disengaged from the power transmitting means, resilient means connected to said rods and arranged to normally hold both brakes in their locked position, and handle bars connected to said turntable to selectively pivot the same whereby pivotal movements of said turntable in one direction moves a first one of said brakes to its unlocked position and pivotal movement in the opposite direction moves the other brake to its unlocked position and allows the first brake to return to its locked position.

References Cited in the file of this patent

UNITED STATES PATENTS

| | | |
|---|---|---|
| 725,141 | Robinson et al. | Apr. 14, 1903 |
| 1,462,675 | Whittington | July 24, 1923 |
| 1,560,802 | Julstedt | Nov. 10, 1925 |
| 2,183,514 | Grandberg et al. | Dec. 12, 1939 |
| 2,309,199 | McCormick | Jan. 26, 1943 |
| 2,547,695 | Eaglesfield et al. | Apr. 3, 1951 |
| 2,667,252 | Meyer | Jan. 26, 1954 |
| 2,692,514 | O'Leary | Oct. 26, 1954 |
| 2,703,155 | Simpson | Mar. 1, 1955 |
| 2,713,917 | Soenksen | July 26, 1955 |
| 2,739,657 | Howard | Mar. 27, 1956 |
| 2,803,469 | Pfisterer | Aug. 20, 1957 |
| 2,821,277 | Hughes | Jan. 28, 1958 |

FOREIGN PATENTS

| | | |
|---|---|---|
| 392,057 | Germany | Mar. 15, 1924 |
| 528,807 | Great Britain | Nov. 7, 1940 |